United States Patent
Wolf et al.

(10) Patent No.: US 6,775,897 B2
(45) Date of Patent: Aug. 17, 2004

(54) VERSATILE ADAPTABLE HOLDING APPARATUS FOR HOLDING LARGE FORMAT WORKPIECES AND METHOD

(75) Inventors: Manfred Wolf, Nordenham (DE); Fredo Eisenhauer, Butjadingen (DE); Gerhard Holtmeier, Luebeck (DE); Hartwig Pluemer, Bad Zwischenahn (DE)

(73) Assignees: Airbus Deutschland GmbH, Hamburg (DE); Broetje-Automation GmbH, Wiefelstede (DE)

( * ) Notice: Subject to any disclaimer, the term of this patent is extended or adjusted under 35 U.S.C. 154(b) by 400 days.

(21) Appl. No.: 10/051,683

(22) Filed: Jan. 16, 2002

(65) Prior Publication Data

US 2002/0092149 A1 Jul. 18, 2002

(30) Foreign Application Priority Data

Jan. 16, 2001 (DE) .......................................... 101 01 916
Jul. 18, 2001 (DE) .......................................... 101 34 852

(51) Int. Cl.$^7$ ............................. B23Q 3/00; B25B 27/14
(52) U.S. Cl. ............................. 29/464; 29/466; 29/468; 29/281.1; 29/281.5
(58) Field of Search ........................ 29/464, 466, 468, 29/428, 407.09, 524.1, 525.06, 281.1, 271, 281.5, 243.53

(56) References Cited

U.S. PATENT DOCUMENTS

| 3,772,753 | A | * | 11/1973 | Sargeant ....................... 29/721 |
| 5,664,311 | A | * | 9/1997 | Banks et al. ............. 29/407.04 |
| 6,121,781 | A | | 9/2000 | Martinez |

FOREIGN PATENT DOCUMENTS

DE                  19745145           4/1998

* cited by examiner

Primary Examiner—John C. Hong
(74) Attorney, Agent, or Firm—W. F. Fasse; W. G. Fasse

(57) ABSTRACT

An apparatus for holding a large format workpiece includes first and second sets of support units on opposite sides of the workpiece. Each support unit includes a support arm carrying individual mounting fixtures such as suction units for suction-holding the workpiece. The support arm is pivotably mounted on a support column, which in turn is movable along a floor-mounted rail. A riveting machine includes an upper tool and a lower tool that are movable parallel to the floor-mounted rail. To make space for the machine to set rivets in the area that is supported by a given support arm, that support arm is released from the workpiece and moved away to allow the machine to carry out its riveting cycle at that area, while the greatest possible number of the other support units simultaneously remain in place and continue to support the workpiece.

27 Claims, 11 Drawing Sheets

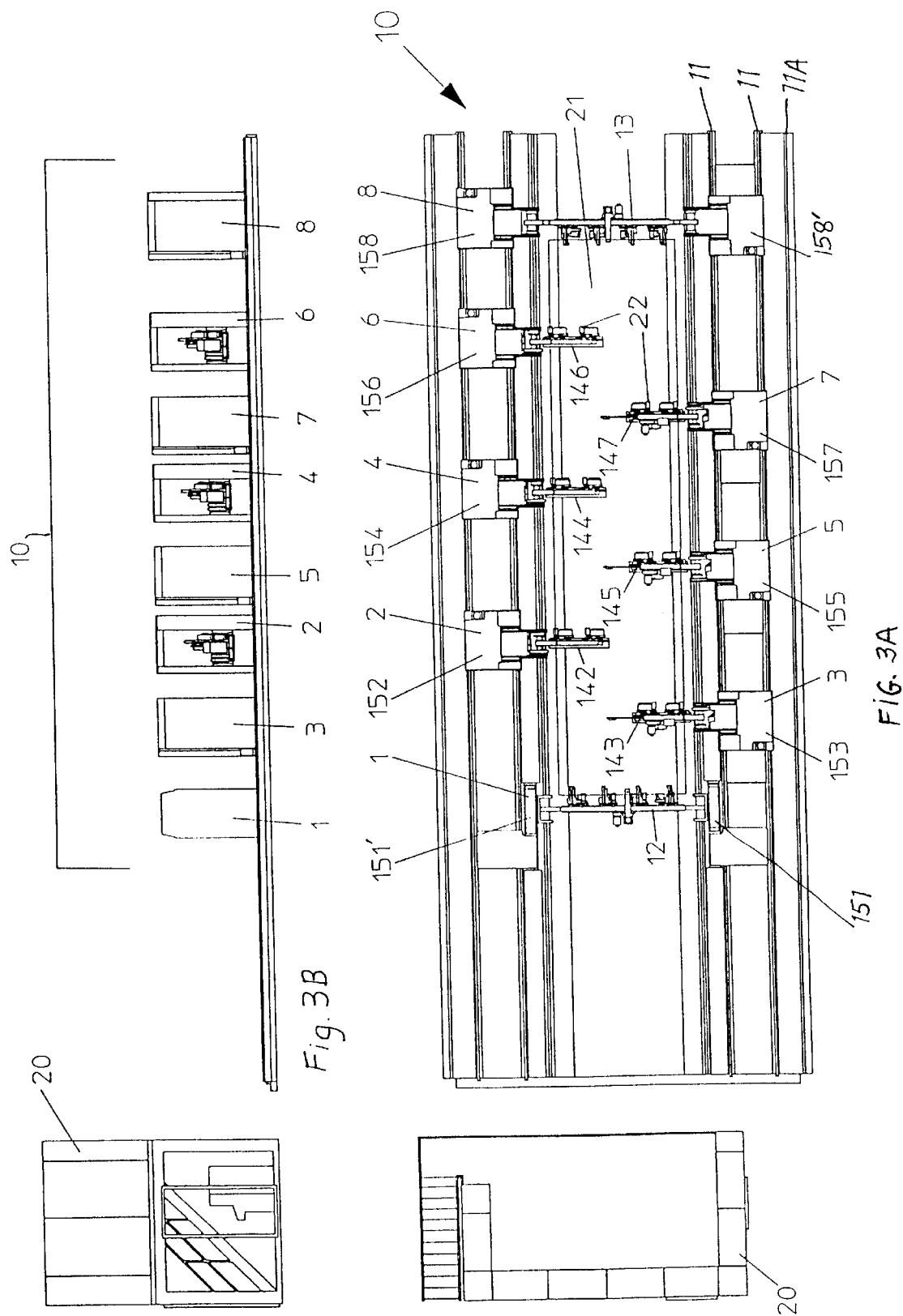

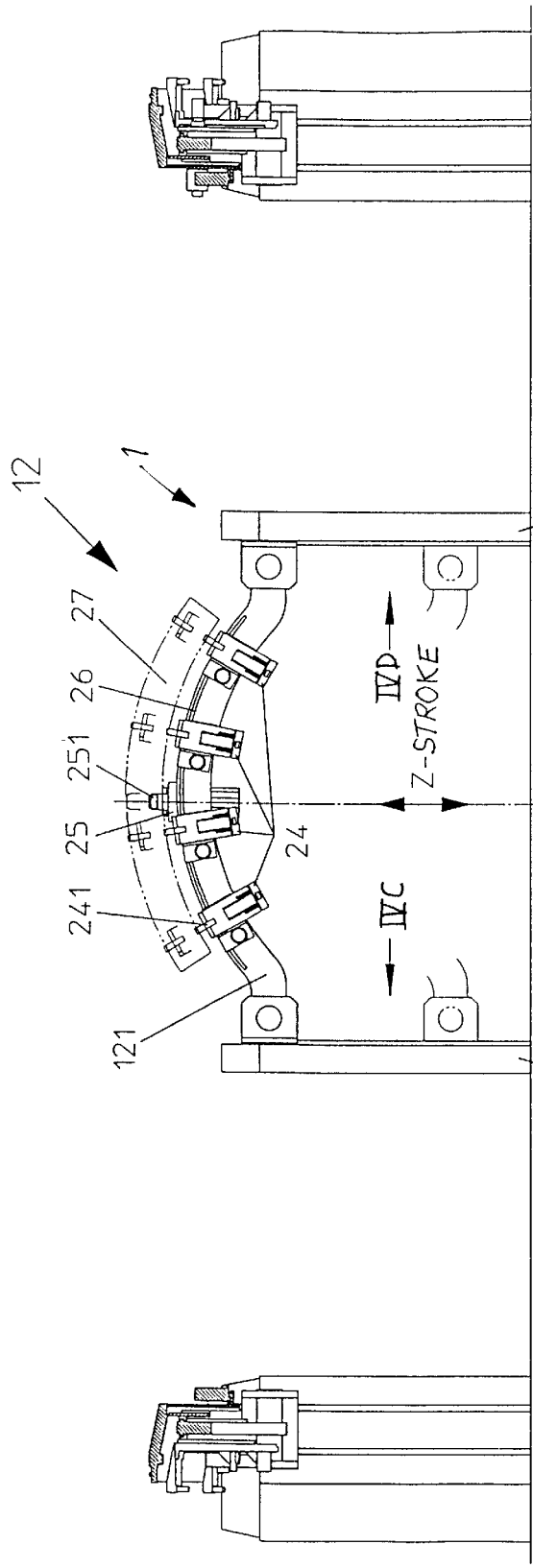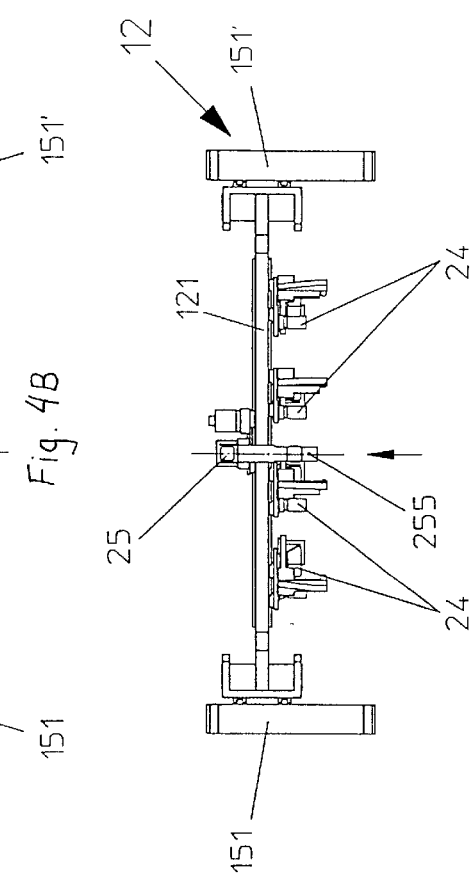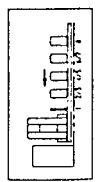

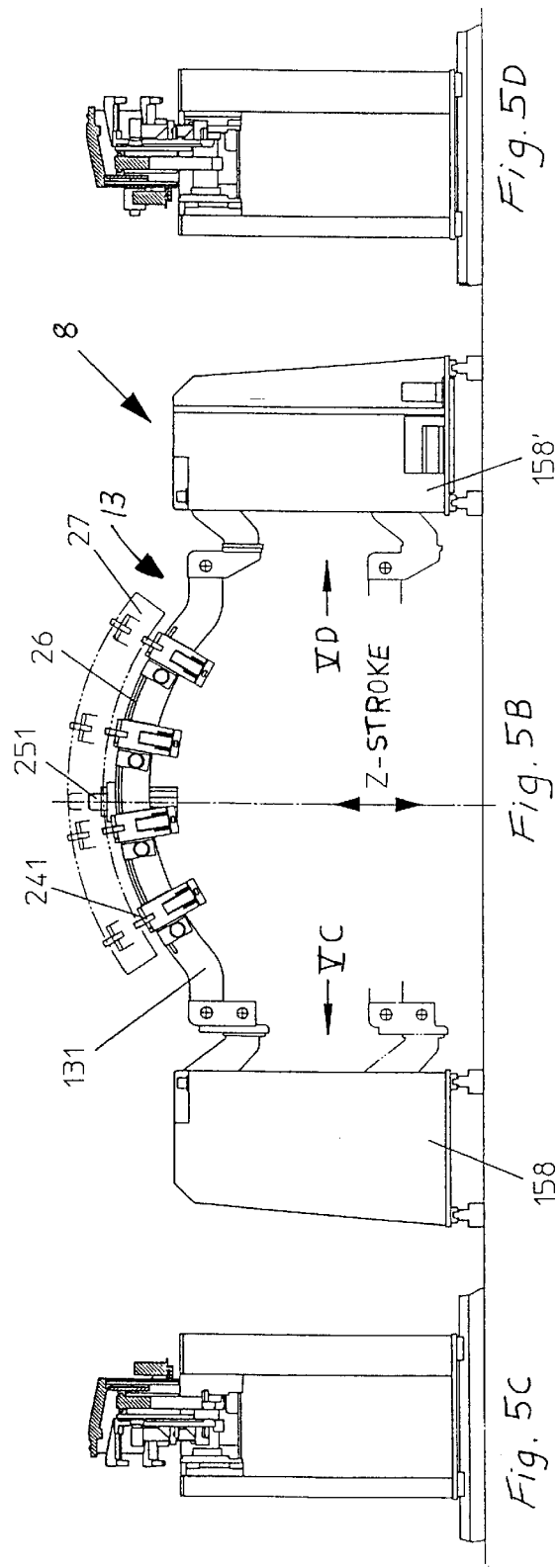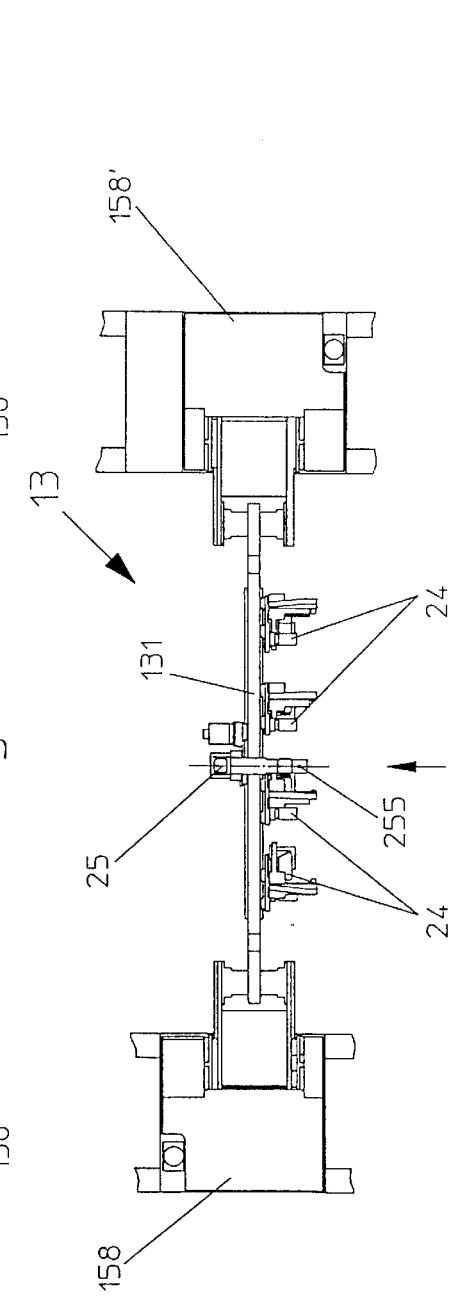

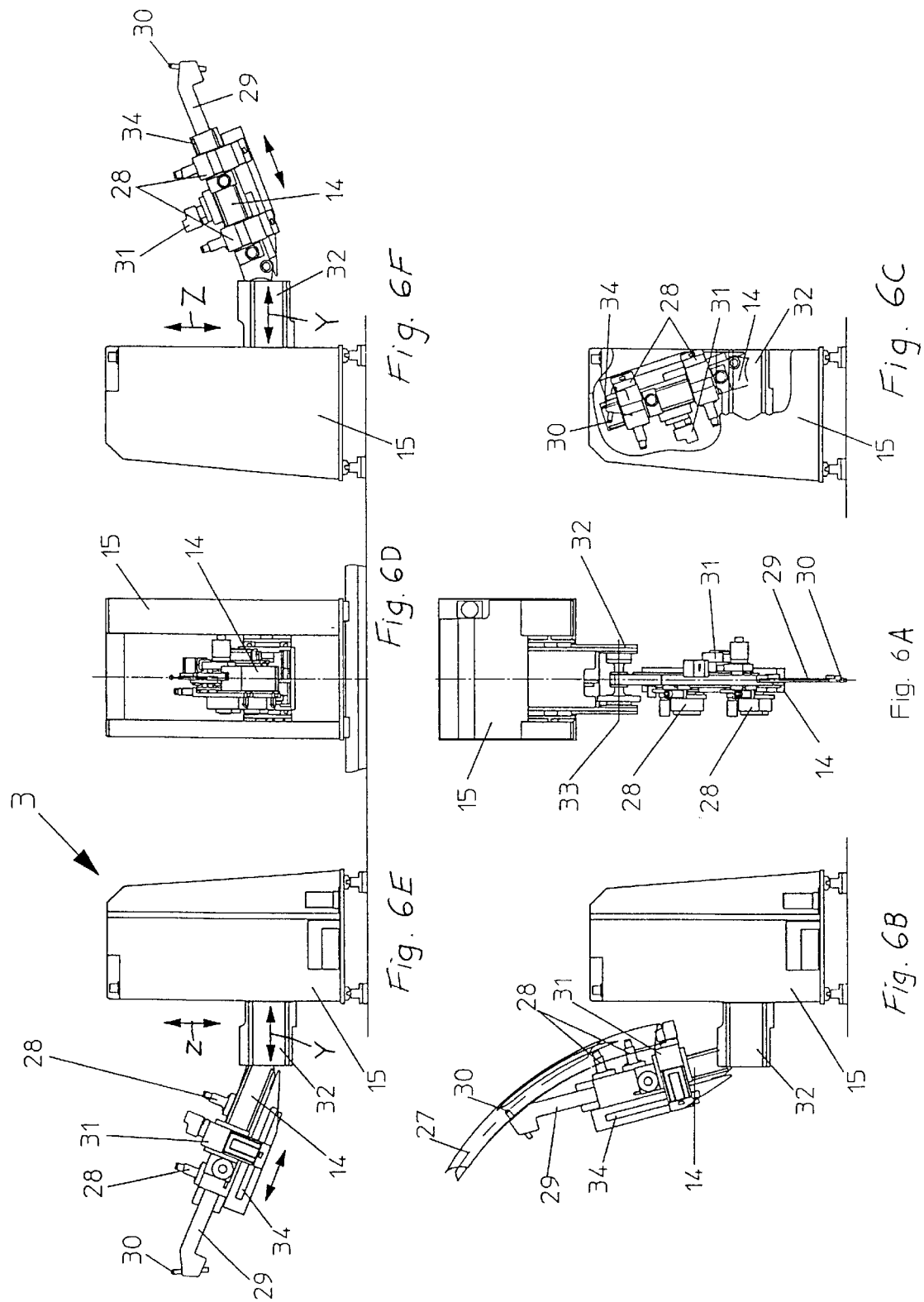

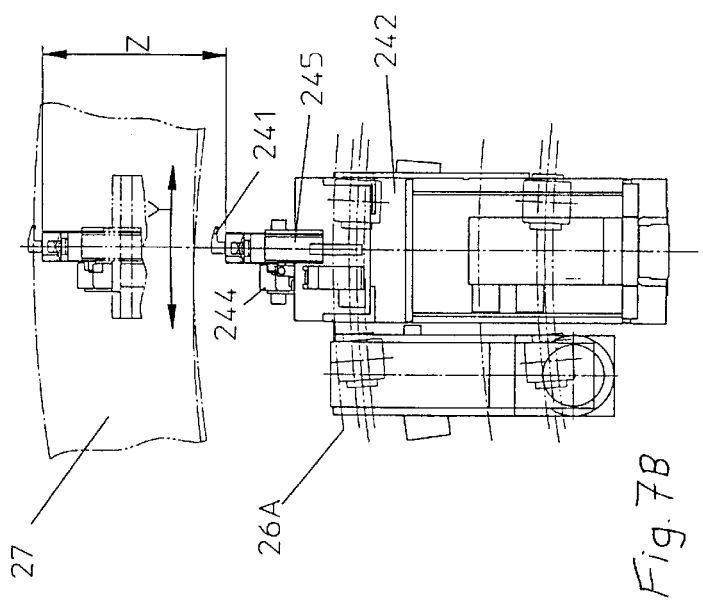
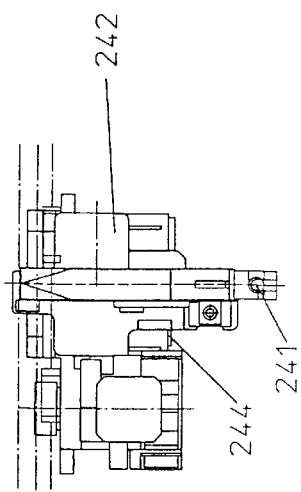
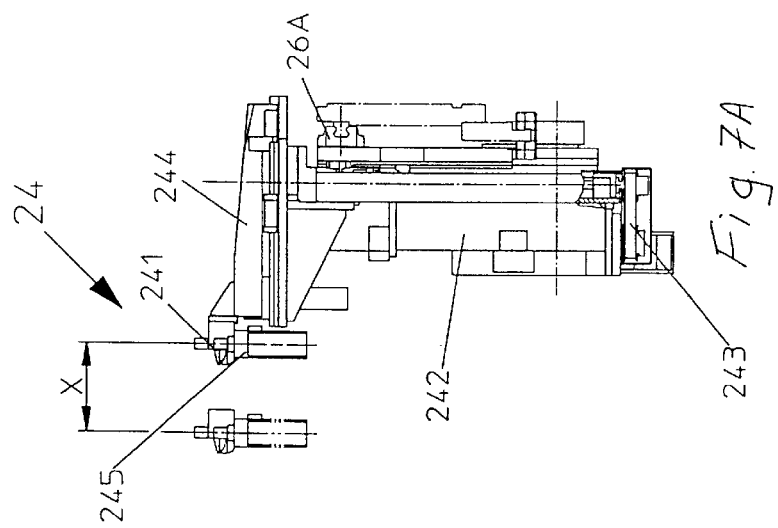
Fig. 7B
Fig. 7C
Fig. 7A

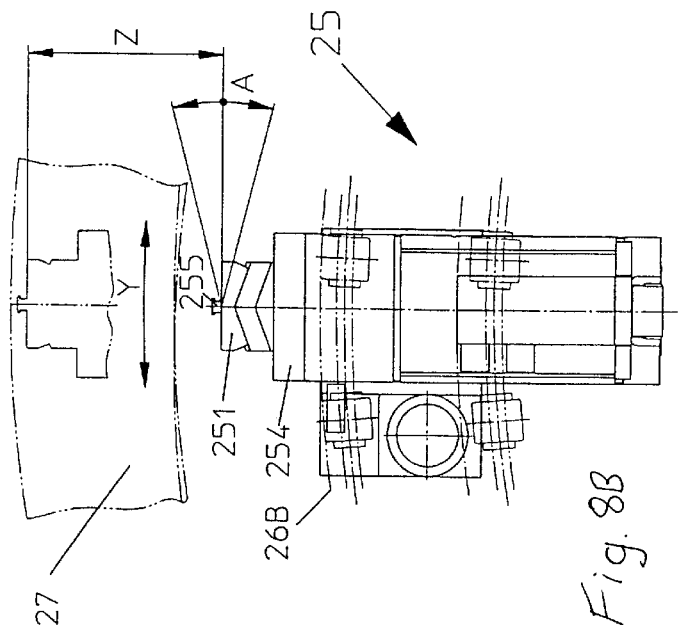
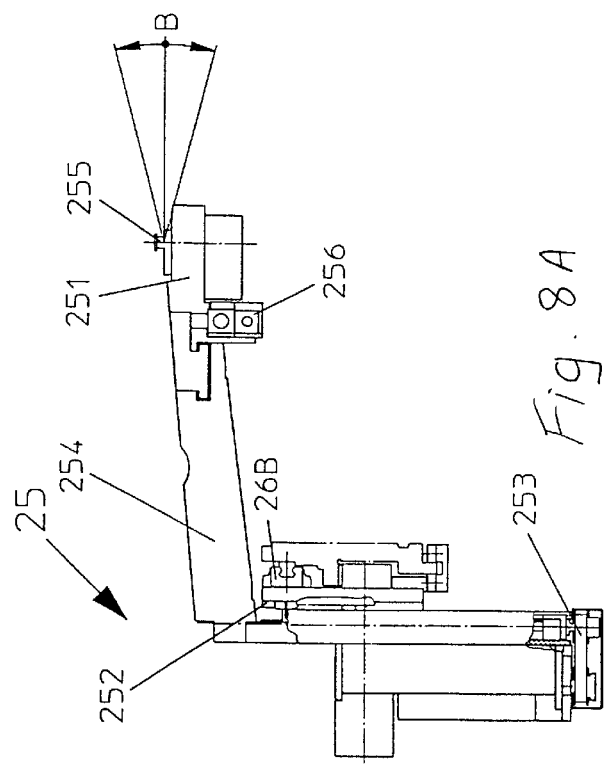
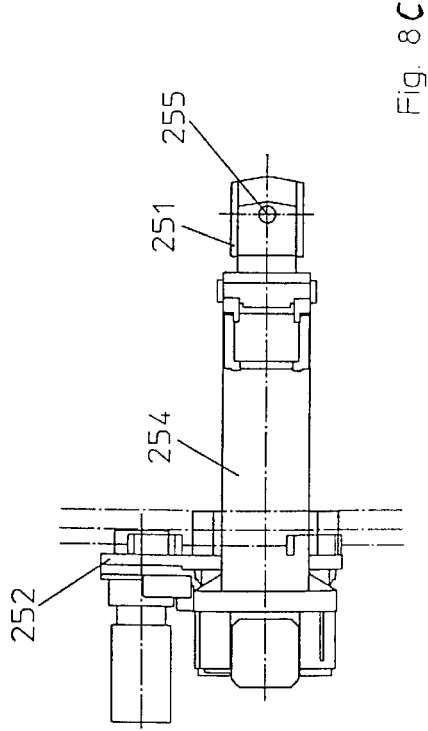

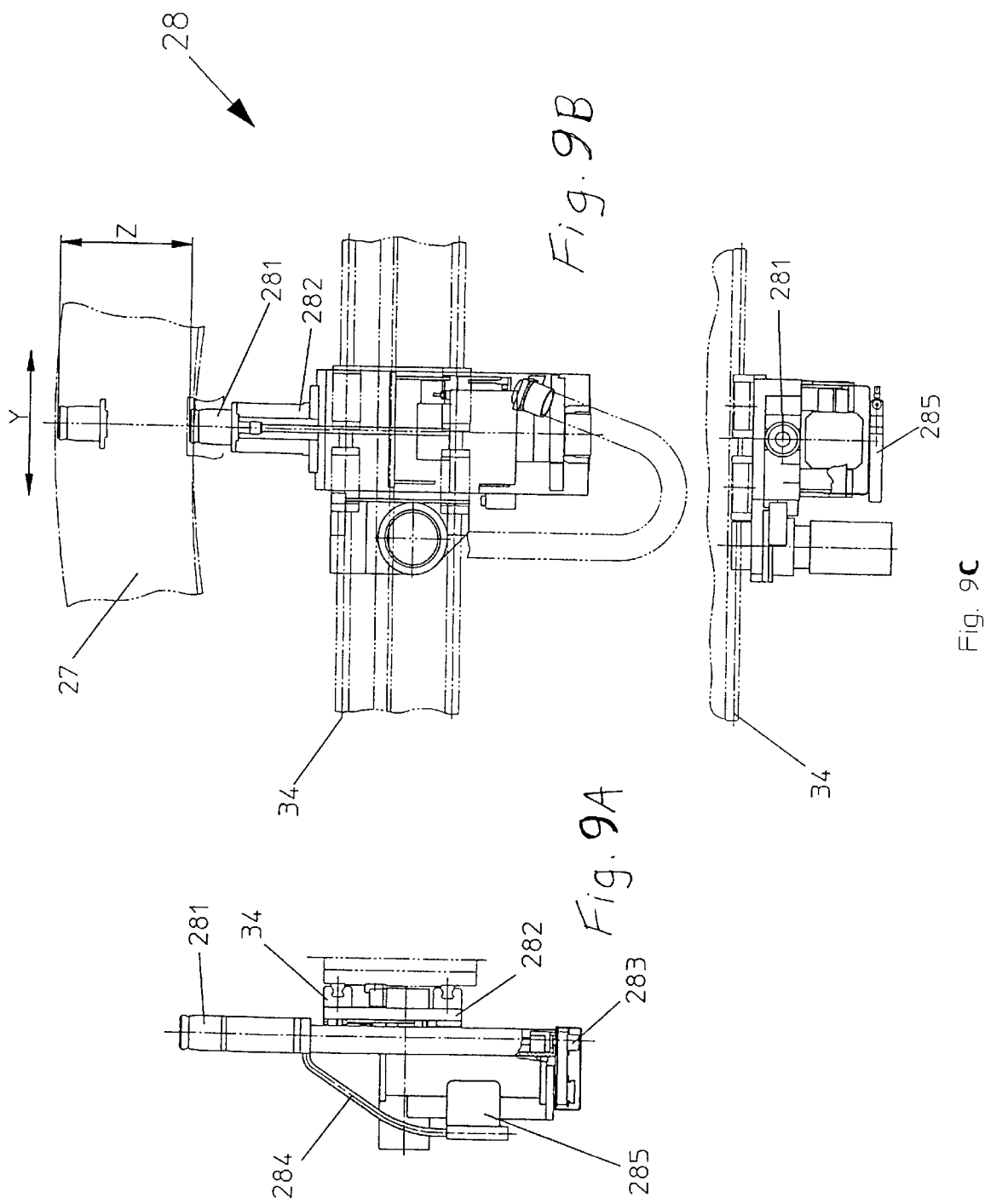

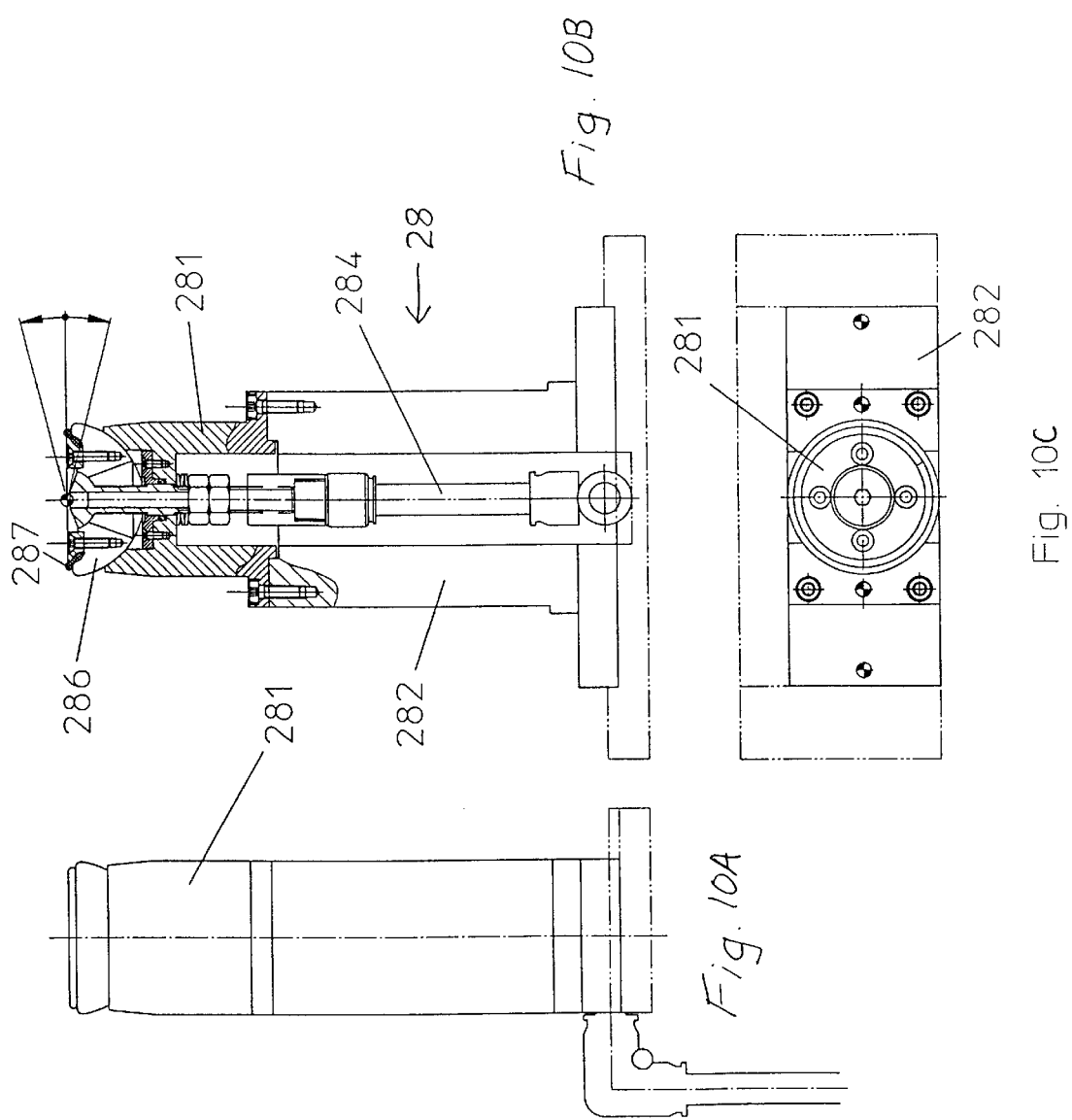

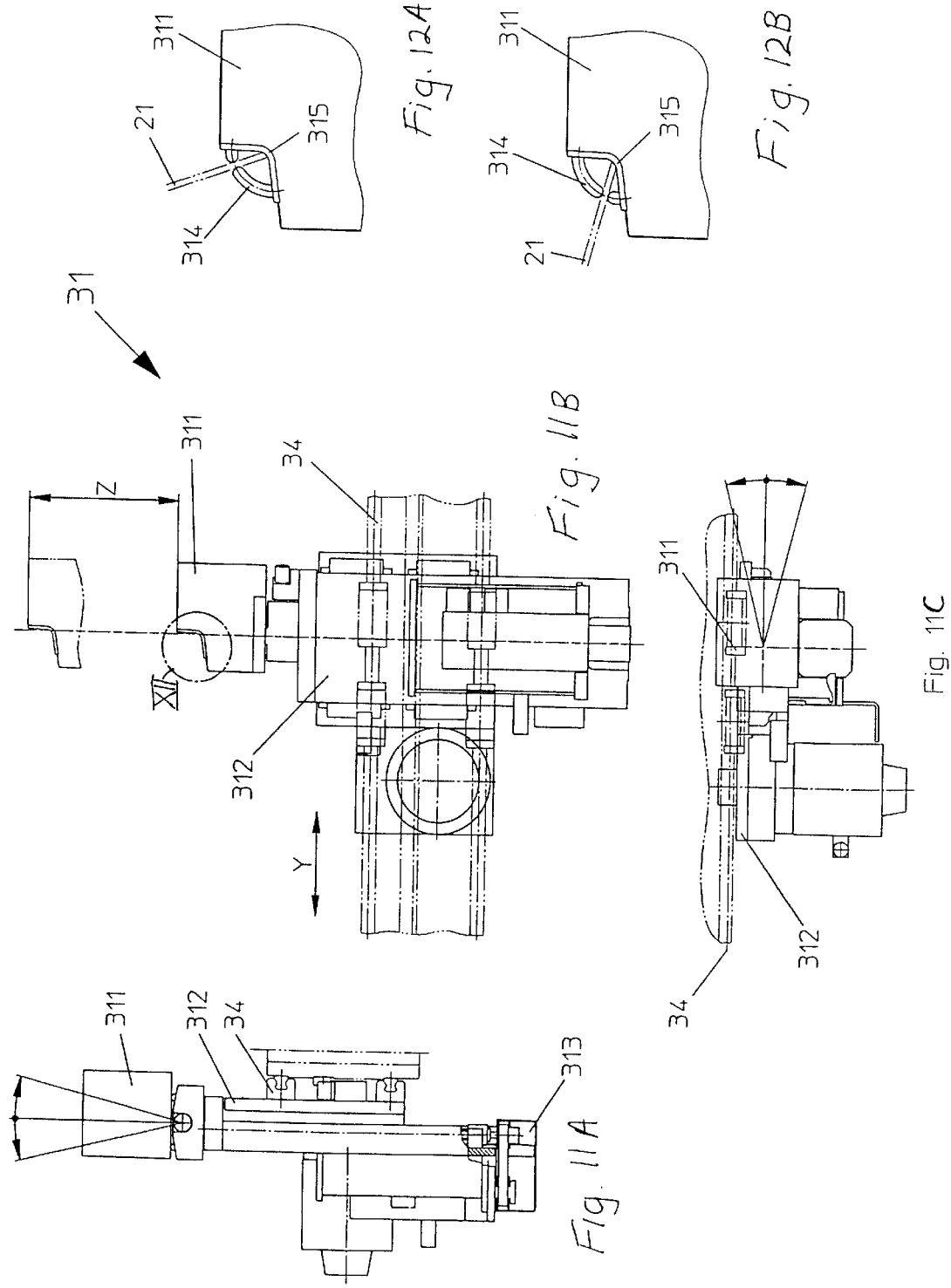

VERSATILE ADAPTABLE HOLDING APPARATUS FOR HOLDING LARGE FORMAT WORKPIECES AND METHOD

PRIORITY CLAIM

This application is based on and claims the priorities under 35 U.S.C. §119 of German Patent Application 101 01 916.5, filed on Jan. 16, 2001 and German Patent Application 101 34 852.5, filed on Jul. 18, 2001, the entire disclosures of which are incorporated herein by reference.

FIELD OF THE INVENTION

The invention relates to a holding apparatus for holding large format workpieces, in the manner of a flexible and adaptable clamping jig system including plural workpiece support units. The invention further relates to a method of mounting and holding large format workpieces so that the workpieces may be machined or worked on with a suitable machine tool system that cooperates with the holding apparatus.

BACKGROUND INFORMATION

Flexible or adaptable workpiece clamping and holding systems are known in the art, for example from the German Patent Publication DE 197 45 145 A1. Disclosed therein is a machine for holding workpieces, whereby the machine comprises several units that comprise arches which are movable along rails. Several of such arches are provided for receiving one or more large format workpieces. The two outermost arches of such a support unit are fixedly connected with the rails, and the entire support unit is transportable and repositionable using a loading crane for carrying out assembly processes. A workpiece (or several such workpieces), is fixed or clampingly mounted on the support unit, and is then pushed into a riveting machine along a further rail system, and the unit is then secured in a rigid or fixed position.

In the known system, to avoid a collision between elements of the riveting machine and elements of the holding system during the riveting process, the respective affected arches can be repositioned or moved to a different position. For this purpose, telescope rods are retracted and the affected arch is moved away along the rails. During this time, the riveting process is interrupted and is in a resting state or standstill. It is further disadvantageous that moving away the respective arch in this manner results in a complete removal of the support and clamped fixing of the workpiece in the entire region or area of the freed arch. After the riveting process is completed, the entire workpiece carrier is pushed out of the riveting machine, and further working or processing steps can be carried out on the workpiece, or the workpiece carrier is transferred or shifted and the workpiece is dismounted from the carrier unit.

Thus, in general, the known holding apparatuses of the above general type have been developed and built on the basis of existing support or carrier systems in the context of the relevant installation technology, for example utilizing exchange and/or positioning frames, apparatus rigging scaffolds, joining stations, portal systems, assembly or rigging table systems, and the like. To some extent, the assembly and positioning processes must be developed and carried out according to complex technical and time-based control schemes. Moreover, high capital investments in the installation technology have been necessary, especially when a large spectrum of workpieces with various different dimensions and configurations is to be handled. The final outfitting or equipping of the installation is typically carried out through the use of further subsystems such as work platform structures, transfer carriages, lift platforms, conveyor baskets, and the like. In this context, a rather high logistic effort must be carried through, especially due to the large dimensions of the workpieces (for example approximately up to a size of 11 m×3 m for the skin fields or panels of an aircraft fuselage), and due to the possible curvatures of the large format workpieces that are to be joined together.

SUMMARY OF THE INVENTION

In view of the above, it is an object of the invention to provide an apparatus for holding large format workpieces, which avoids the use of rigid or fixed carrier systems with geometrically determined apparatuses or devices, and thereby reduces the complexity, effort and investment in the installation technology. A further object of the invention is to achieve a flexibly adaptable stressed or clamped holding and support of workpieces of various different forms and sizes using the same basic holding apparatus. The invention further aims to avoid or overcome the disadvantages of the prior art, and to achieve additional advantages, as apparent from the present specification.

The above objects have been achieved according to the invention in a holding apparatus for holding large format workpieces, including plural workpiece support units that are movable along a rail system. One set of some of the workpiece support units is arranged along one side of the workpiece, while a second set of the other ones of the workpiece support units is arranged along the other side of the workpiece. At least some of the workpiece support units respectively comprise support arms that are movable and pivotable on a support column. In order to make space for a working machine or machine tool system such as a riveting machine, so that the machine may carry out a work cycle in the area of one of the workpiece support units, a minimum number of support arms is movable out of the working area of the machine, while the greatest possible number of support arms of the respective workpiece support units continue to simultaneously support and hold the workpiece. The holding is often referred to as "clamping" herein, which relates to the overall clamped or positively held and supported condition of the workpiece, but does not require that each support arm must actually use a clamp to hold the workpiece. Instead, the holding may be achieved by any conventionally known fixture for holding such a workpiece, and preferably according to the invention the holding is achieved by suction units on the support arms, while clamp members are provided on the outermost support units.

According to further detailed features of the invention, the outermost ones of the workpiece support units are embodied as a respective front and rear clamping support bridges, with support arches supported on both sides in respective support columns. The support bridges extend archingly entirely across the support area for supporting the workpiece between the two respective support columns, while the support arms of the other workpiece support units each only extend partially across the width of the support area. Clamping units and at least one fixing unit may be provided on at least one of the support bridges for respectively clampingly holding the end edges of the workpiece and for precisely positioning the workpiece in connection with a predefined receiver hole in the workpiece.

At least one individual mounting fixture is provided on the support arm of each workpiece support unit. The support arm is preferably movably arranged on and connected to the respective support column, which in turn is movable in a direction parallel to the main machining axis or working direction. By the appropriate movement of the support arms, the workpiece support units provide at least one loading position and one working position, whereby the workpiece support units are height adjustable in the working position, in order to form an access space below the support arms or support bridges. The support arms can, individually and independently of each other, be released from the workpiece and moved out of the working area or working range of the machine, such as a riveting machine, so as to provide the necessary working space for the machine.

The above objects have further been achieved according to the invention in a combination of the inventive holding apparatus and a workpiece machining or working machine, such as an orbital riveting machine including an upper tool and a lower tool, whereby the machine can move with its upper tool over the workpiece support units, and with its lower tool between and laterally past the support columns of the workpiece support units.

Still further, the above objects have been achieved according to the invention in a method of machining or working on a large format workpiece using the inventive combination of the holding apparatus and the working machine. The workpiece support units are moved into the loading position, in which the support arms of the workpiece support units in at least one row are tilted upwardly. The workpiece is set onto an outer load receiver and then laid against an inner load receiver of each respective support arm. Then the workpiece is released from the workpiece feed or supply apparatus and is carried only by the holding apparatus. Thereafter, the upwardly pivoted support arms are lowered until a contact support of the workpiece on the other row of workpiece support units is achieved. Then the workpiece is fixed and clamped along its lateral edges, whereby the workpiece is supported and held by the workpiece mounting fixtures. Then, while the machining or other working process such as a riveting process is carried out, and the support units are in the working position, a minimum number of the support arms is moved out of the working range or zone of the tools of the working machine, so as to provide the necessary space for the machine to carry out a work cycle in the area of one of the support arms, while the greatest possible number of the remaining support arms simultaneously continue to support the workpiece.

The apparatus and the method according to the invention make it possible to react and correspondingly adapt the apparatus and the method flexibly to varying requirements during the fabrication or assembly process, for example a readjustment to different workpiece dimensions or the like. It also becomes possible to reduce the mounting, rigging or setup time. The following advantages are also achieved: avoiding the use of a carrier system, and especially a fixed carrier system; avoiding the use of subsystems; improving the ergonomics of the mounting or rigging processes; increasing the flexibility and adaptability of the clamping support system, for example using a tower or column based solution; using additional possible auxiliary axes; and being able to handle a large spectrum of workpieces with the largest possible dimensions, for example in terms of the spherical dimensions or the bulging or humping dimensions of the workpieces.

BRIEF DESCRIPTION OF THE DRAWINGS

In order that the invention may be clearly understood, it will now be described in connection with example embodiments, with reference to the accompanying drawings, wherein:

FIG. 3A is a top view of the holding apparatus according to FIG. 1;

FIG. 3B is a side view of the holding apparatus according to FIG. 1;

FIGS. 4A and 4B are respectively a top view and an end view of a first workpiece support unit at a front end of the holding apparatus, embodied as a front bridge support;

FIGS. 4C and 4D are respectively partially sectioned side views as indicated by arrows IVC and IVD in FIG. 4B;

FIGS. 5A and 5B are respectively a top view and an end view of an eighth workpiece support unit at a rear end of the holding apparatus, embodied as a rear bridge support;

FIGS. 5C and 5D are respectively partially sectioned side views as indicated by arrows VC and VD in FIG. 5B;

FIGS. 6A and 6D are respectively a top view and a side view of one of the workpiece support units along the middle range of the inventive holding apparatus, between the end bridge supports;

FIGS. 6B and 6C are two opposite end views of the workpiece support unit of FIG. 6A, respectively in a loading position and in a retracted position;

FIGS. 6E and 6F are respective opposite end views of the workpiece support unit shown in FIG. 6D;

FIGS. 7A, 7B and 7C are respectively a side view, an end view, and a top view of a clamping unit as a component of one of the workpiece support units;

FIGS. 8A, 8B and 8C are respectively a side view, an end view, and a top view of a fixing unit as a component of one of the workpiece support units;

FIGS. 9A, 9B and 9C are respectively a side view, an end view, and a top view of an outer suction unit as a component of one of the workpiece support units;

FIGS. 10A, 10B and 10C are respectively a side view, an end view, and a top view of a tiltable or pivotable suction unit as a component of one of the workpiece support units;

FIGS. 11A, 11B and 11C are respectively a side view, an end view, and a top view of an outer load receiver as a component of one of the workpiece support units; and FIGS. 12A and 12B are respective detail views of the detail portion XII in FIG. 11B, respectively for a minimum workpiece arch contour, and for a maximum workpiece arch contour.

DETAILED DESCRIPTION OF PREFERRED EXAMPLE EMBODIMENTS AND OF THE BEST MODE OF THE INVENTION

Figure 1:
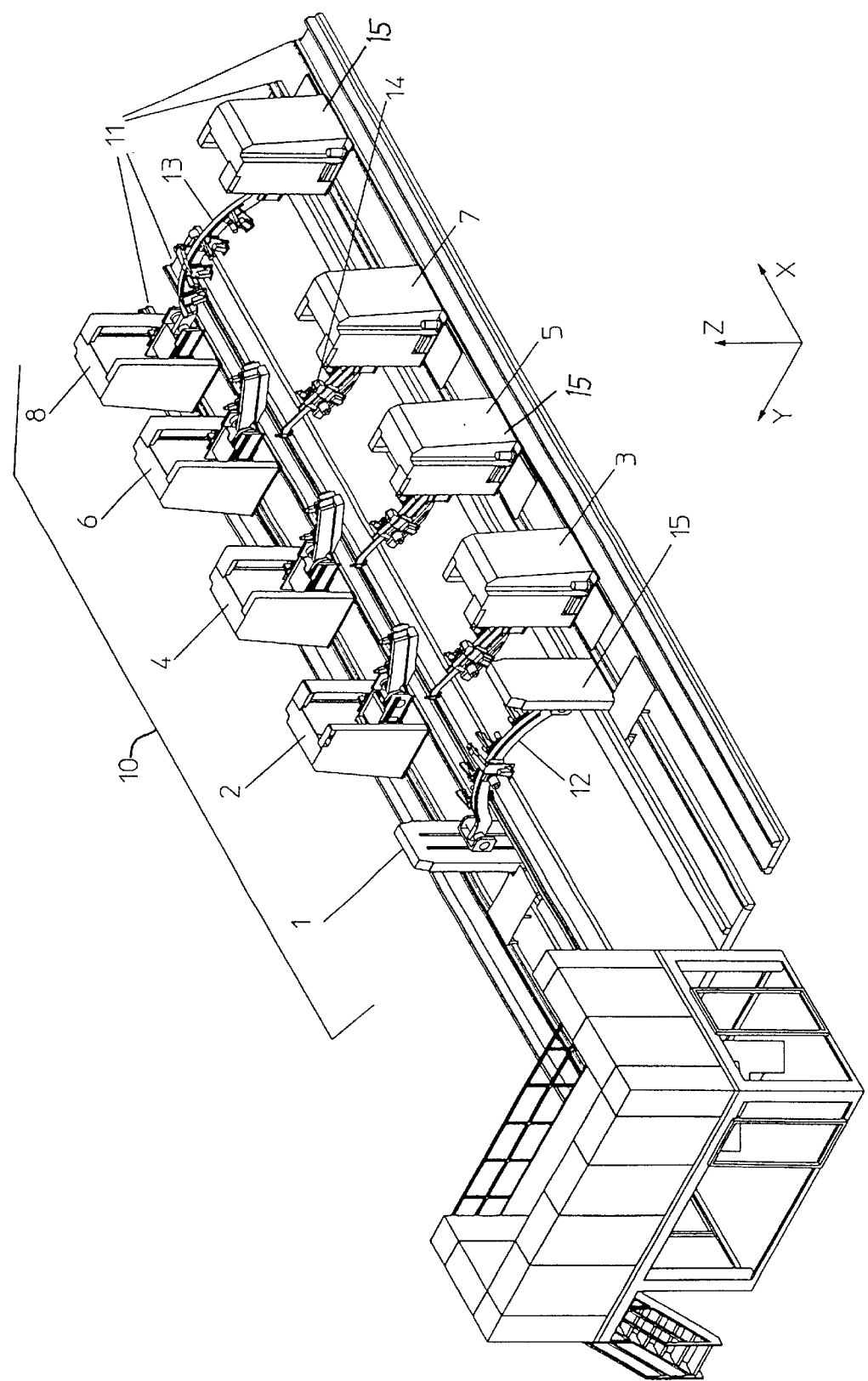
FIG. 1 is a perspective overall view of a holding apparatus according to the invention.

FIG. 1 shows a general overview of a holding apparatus 10 according to the invention, for holding large format workpieces, for example, curved metal skin sheets that are to be assembled together for producing the outer skin fields or sections for fuselage shells or similar workpieces of an aircraft. In general, the term large format workpiece relates to a workpiece that has large area dimensions in comparison to a rather small thickness. For example, the fuselage skin fields that are to be produced can have dimensions up to approximately 11 m×3 m in connection with the manufacturing of a commercial passenger transport aircraft. In addition to the skin sheets, longitudinally extending stringers are to be joined (e.g. riveted) onto the skin sheets to form cylindrically or spherically curved workpieces.

The holding apparatus 10 is embodied as a flexible clamping support jig system that can be adapted to clampingly hold and support a great variety of different sizes and configurations of large format workpieces so that the required machining or working operations can be performed thereon. Such machining or working operations may, for example, include milling, boring, grinding, reaming, riveting, welding, adhesive application, surface cleaning, and the like. The various types of workpiece machining or processing that can be carried out once the workpiece is supported by the inventive holding apparatus 10 is not limited.

The holding apparatus 10 comprises a plurality of workpiece support units, for example in the illustrated embodiment, a total of eight workpiece support units 1 to 8. The workpiece support units 2 to 8 are movably arranged and supported on a rail system including plural, e.g. four, rails 11, and can thereby be flexibly or adaptably moved and positioned along the rails 11 depending on the particular application. The rail system 11 is preferably secured to the floor of an assembly hall or the like, and extends longitudinally along a main transport or motion direction, which is identified as the X-direction by the coordinate system indicated in FIG. 1. Thereby, the workpiece support units 1 to 8 are each individually and independently movable along the rails 11 in the X-direction. To achieve this motion in a powered manner, each of the support units may include any known motors, actuators or the like, and mechanical drive systems cooperating therewith.

The outermost workpiece support units 1 and 8, respectively located at a front end and a rear end of the apparatus 10, respectively include clamping support bridges 12 and 13 that archingly span across the width of the apparatus 10 from one side to the other side thereof, and which are each respectively supported by support columns or stands 15 at the two opposite sides thereof. On the other hand, the inner workpiece support units 2 to 7. located inwardly from the front and rear ends of the apparatus 10, each respectively comprise an individual workpiece support arm 14 that is respectively movably supported on only one side (i.e. at only one end thereof) on a support column or stand 15.

A first set of the inner workpiece support units 2, 4 and 6 is arranged on one side, and a second set of the inner workpiece support units 3, 5 and 7 is arranged on the opposite side of the apparatus 10. The workpiece support units of the first set 2, 4 and 6 are positioned alternately staggered or interleaved with the workpiece support units of the second set 3, 5 and 7, along the longitudinal X-direction as shown especially in FIGS. 1 and 3A. The essential details of the workpiece support units 1 to 8 are shown and described more exactly in connection with FIGS. 4 to 12, whereby each of these FIGS. 4 to 12 includes several subfigures, such as FIG. 4 including subfigures 4A, 4B, 4C and 4D.

Figure 2:
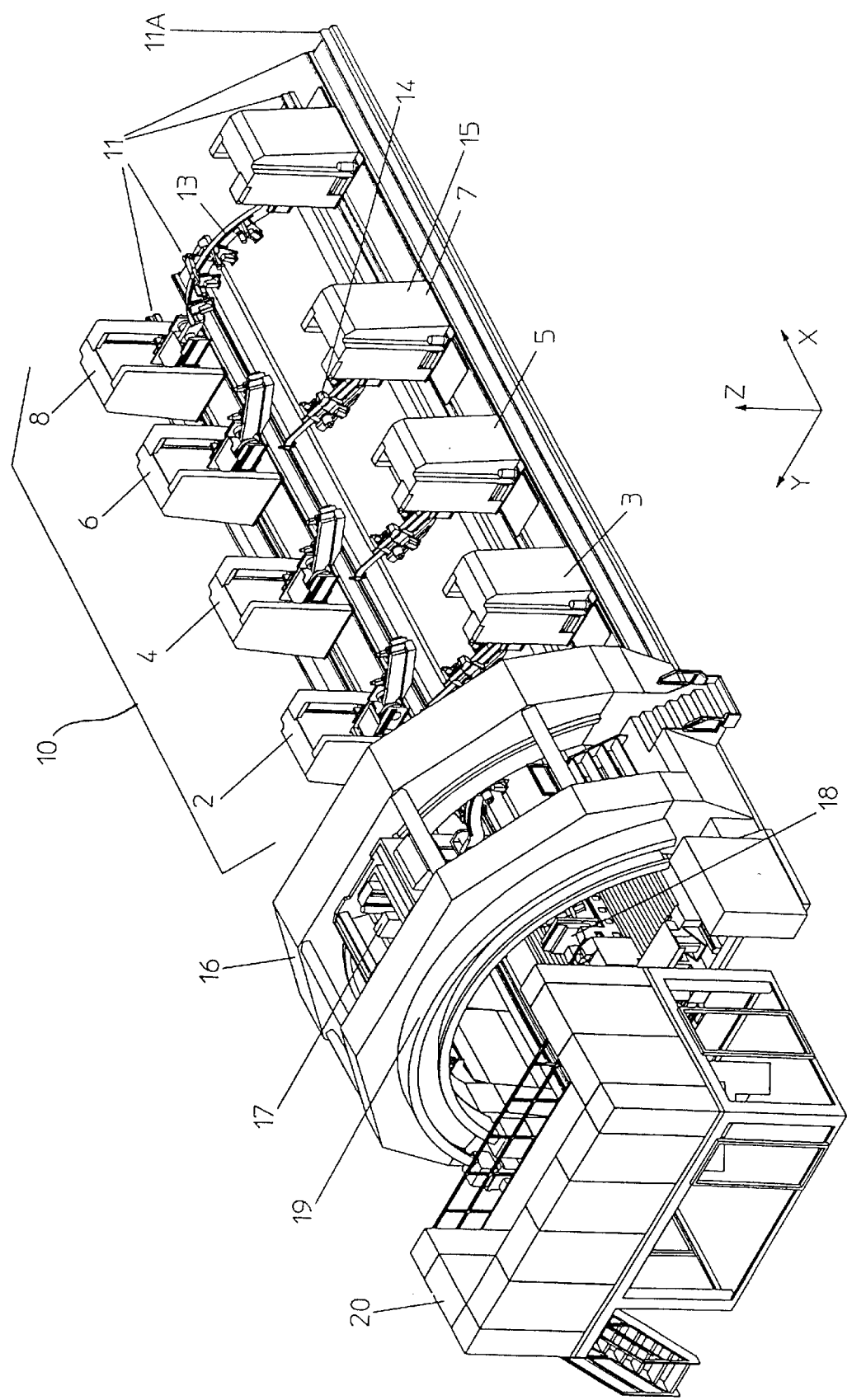
FIG. 2 is a perspective overall view of the inventive holding apparatus in combination with a working machine or machine tool system, particularly an orbital riveting machine.

FIG. 2 shows a machining or tooling system, i.e. working machine 16, including an upper tool 17 and a lower tool 18, combined and coupled with the inventive holding apparatus 10, in order to machine or work on large format workpieces, for example cylindrically or spherically curved skin fields of an aircraft fuselage shell. In the illustrated embodiment, the working machine 16 is embodied as an automatic orbital riveting machine that covers a working range along an arc of up to approximately 120°. The working machine or riveting machine 16 is supported separately from the holding apparatus 10 on a second rail system including rails 11A, that also extend parallel to the main longitudinal axis of the apparatus in the X-direction, i.e. parallel to the rail system 11.

The upper tool 17, here the upper or outer riveting tool 17, is arranged and movably supported by appropriate guides on a semicircular arch 19 of which the two opposite ends are movably supported on the rail system 11A. Thereby, the upper tool 17 is movable in the X-direction by moving the arch 19 along the rail system 11A, and is movable in an orbital or circumferential direction around the X-axis by moving along the arch 19, for carrying out the required working process such as a riveting process. The lower tool 18, here the lower or inner riveting tool 18, is positioned within and below the arch 19, preferably in the area of the circular arc center point of the arch 19. The upper tool 17 and the lower tool 18 cooperate with each other for carrying out a riveting process at respective prescribed rivet locations in sequence. Positioning the tools 17 and 18 at a respective rivet location, and controlling the progression of a riveting process, are carried out by a program control, for example numerical control (NC) programs, which thereby realize a substantially automated riveting operation.

Simultaneously, the control of the riveting tools 17 and 18 can be coupled to the control of the holding apparatus 10. Thereby it is possible to recognize any conflicts or interferences that would arise between components of the holding apparatus 10 and components of the riveting machine 16, timely before such interferences or conflicts actually cause a collision problem, and then to responsively move the affected support arm or arms 14 out of the working area of the riveting machine 16. The overall control computer that carries out these control functions is arranged in a computer control station 20, from which monitoring and control functions can also be carried out by a worker, for example through manual inputs in an operating console or the like. Control lines (e. g. electrical or optical conductors or a wireless remote control link) connect the computer control station 20 to the various actuators, motors, and the like in each of the support units.

The working machine 16 such as a riveting machine 16 is configured and arranged in such a manner that the upper tool 17 can be freely moved over the workpiece support units 1 to 8 by moving the arch 19 along the rail system 11A, while the lower tool 18 can be moved freely between and laterally past the workpiece support units 1 to 8 and particularly the support columns 15 thereof (namely laterally between the support columns 15 on one side and the support columns 15 on the other side of the apparatus 10). In this regard, the lower tool 18 can move along a further longitudinal rail in the X-direction on the floor of the assembly hall, for example.

As mentioned above, the workpiece support units 1 to 8 are arranged in an alternating or staggered fashion in two rows parallel to the main motion direction X on the two opposite sides of the apparatus 10, whereby two longitudinally extending rows of working zones or clamping support zones are formed. The workpiece support units 1 to 8 are embodied and controlled by the computer control station 20 in such a manner, so that a predetermined number of these units can be selectively moved out of the working area of the machine 16 as required, in order to provide the required free clearance space for the machine 16 to carry out its work cycle in the area of one of the above mentioned clamping support zones, i.e. in the area of one of the support arms 14 of the workpiece support units 2 to 7. Meanwhile, the greatest possible number of the clamping units simultaneously remains in position to hold and support the workpiece. In other words, only the particular support arm or arms 14 that is/are in the way of the respective working operation of the machine 16 is/are moved out of the way while all of the other support arms 14 continue to support the workpiece outside of the immediate area at which the machine 16 is carrying out its working operation at any given time.

FIGS. 3A and 3B respectively show a top view and a side view of the holding apparatus 10, whereby especially the arrangement of the workpiece support units 1 to 8 relative to each other, as well as the position of the large format workpiece 21 in its clampingly supported condition, are clearly shown. The front clamping support bridge 12 is rigidly fixed in relation to the rail systems 11 and 11A, and thereby forms a fixed reference point for coordinating the coordinate systems of the holding apparatus 10 and the working machine 16. The front and rear clamping support bridges 12 and 13 respectively fix and clamp the front and rear end edges of the workpiece 21. On the other hand, the workpiece support arms 14 fix and support the workpiece 21 from below on the bottom surface thereof via individual mounting fixtures 22, which are embodied as suction fixtures that hold the workpiece 21 by means of a suction force in the present example embodiment.

In FIGS. 1, 2, 3A and 3B it can be seen that the workpiece support units 1 to 8 of the holding apparatus 10 are arranged in such a manner that the entire space and especially the assembly hall floor under and between the workpiece support units 1 to 8 is freely accessible during the working or machining process. Moreover, an access alley or space is provided longitudinally along the center plane of the apparatus 10 in the middle between the two rows of units 1 to 8, which allows a worker to walk essentially upright along this clear space or alley.

In each support zone of the holding system, a respective one of the support units 2, 3, 4, 5, 6 or 7 is arranged and provided with a respective support arm 14, which in turn is respectively equipped with one or more individual mounting fixtures 22 (see for example the suction unit 28 in FIG. 9). Each support arm 14 is movably arranged on a respective support column or stand 15 that is movable along the rail system 11 parallel to the main longitudinal machine axis or direction X. Each individual support arm 14 in each respective working or support zone can be released from supporting the workpiece 21 and simply moved away from the working zone or retracted into its associated support column or stand 15, independently of the other support arms 14, so that this retracted support arm 14 no longer protrudes into the working zone or area of the machine 16. The individual mounting fixtures 22 are respectively movable along the length of the respective associated support arm 14 and further comprise respective workpiece support elements 23 (such as the suction head 281 shown in FIG. 9) that are respectively movable in height, i.e. in the Z-direction.

For individual identification, the support columns 15 of the several support units 1 to 8 are respectively identified with reference numbers 151 to 158 in FIG. 3A. The support columns or stands 151 and 151' of the front support unit 1 carrying the support bridge 12 are rigidly fixed relative to the rail system 11, as mentioned above. On the other hand, the rearmost support columns 158 and 158' of the support unit 8, and the intermediate support columns 152, 153, 154, 155, 156 and 157 of the intermediate support units 2 to 7, are each individually movable in the X-direction along the rails 11. Thereby, the support columns 152 to 157 can be moved toward the left in FIG. 3A along the rails 11, past the front support columns 151 and 151' so as to be taken out of the working zone of the machine 16. For this purpose, the front support columns 151 and 151 are laterally narrower or less deep than the support columns 152 to 158, to allow clearance for the other support columns 152 to 157 to move past the columns 151 and 151' along the rails 11.

In this manner, the number of the support units 2 to 7 being used for supporting any given workpiece 21 is variable and can be selected to meet the requirements of any particular application, e.g. dependent on the size, stiffness, and configuration of the respective particular workpiece 21 to be supported, as well as the machining forces that will be applied to the workpiece 21. With such a flexible arrangement of workpiece support units 1 to 8, it is possible to avoid a complicated and time consuming reconfiguration or retooling of the support equipment for adapting it to various workpiece sizes, and to avoid the use of specialized type-specific and geometry-specific apparatuses and devices.

The four views of FIG. 4, namely FIGS. 4A, 4B, 4C and 4D, respectively show a top view, a rear end view, and two partially sectioned side views of the front support unit 1 which includes the front support bridge 12 comprising a support arch 121 that extends between and is supported on both of its ends on the support columns 151 and 151'. These support columns 151 and 151', and therewith the support bridge 12, are fixable on the assembly hall floor, in order to thereby provide a reference point for the workpiece coordinates and the tool coordinates. The support arch 121 is vertically movable along the support columns 151 and 151', namely to be movable upwardly and downwardly in the Z-direction, in order to facilitate a loading process of loading a workpiece into the apparatus, or to make it possible to establish various different working heights of the machine 16 by supporting the workpiece at any selected height. In order to allow the lower tool 18 to move under the support arch 121 so as to access the underside of the workpiece 21 during the machining or working process, the support arch 121 is generally moved to a working position at or near the top end of the range of vertical motion near the top of the support columns 151 and 151', as illustrated in FIG. 4B. The position illustrated with dashed lines is the loading position.

Plural clamping units 24 as well as one fixing unit 25 are arranged on the support arch 121. When first laying the workpiece 21 onto the holding apparatus 10, the fixing unit 25 serves to achieve a first positioning and orienting in the X-direction and the Y-direction of the large format workpiece 21 at a defined fixed point. For this purpose, an alignment pin 255 may, for example, be positioned into a receiving hole (not shown) of the workpiece 21, defining a fixed point on the workpiece 21. Then, the workpiece 21 is clampingly held along its front edge by the clamping units 24, which are each suitably positionable along a guide rail 26 on the support arch 121. The respective clamping heads 241 and fixing head 251 of the clamping units 24 and the fixing unit 25 are adjustably movable in such a manner so that every possible coordinate point within the prescribed workpiece clamping area or range 27 can be reached by these components. Further details regarding the individual components of the clamping unit 24 and the fixing unit 25 will be described below in connection with the several subviews of FIGS. 7 and 8.

With views generally similar to FIGS. 4A, 4B, 4C and 4D, FIGS. 5A, 5B, 5C and 5D similarly show the rear-most support unit 8 comprising the rear support bridge 13 which includes a support arch 131 spanning between and being supported at the two opposite ends thereof on two support columns 158 and 158'. The support arch 131 can be moved vertically in the Z-direction along the support columns 158 and 158', to be moved to the loading position illustrated with dashed lines in order to simplify the process of loading a workpiece, or into the working position illustrated with solid lines, which is compatible with the working height of the machine 16 and which allows the lower tool 18 to move in the X-direction below the support arch 131. This motion can be carried out individually or synchronously with the movements of the support arms 14 and/or the support bridge 12 of the other support units. Preferably, the sequence or progression of the motions of the various workpiece support units and particularly the support arms 14 and the support bridges 12 and 13 thereof is carried out and controlled in a computer supported manner, from the computer control station 20. Plural clamping units 24 as well as one fixing unit 25 are arranged on the support arch 131, whereby the structure and functions thereof respectively correspond to the clamping units 24 and the fixing unit 25 provided on the support arch 121 of the front support bridge 12 as described above. Further details will be described below in connection with the subviews of FIGS. 7 and 8.

The several subviews of FIG. 6 show the support unit 3 as a representative example of any one of the inner support units 2, 3, 4, 5, 6 or 7. Each of these support units respectively comprises a support arm 14 movably supported on a support column 15. While FIGS. 6A and 6D respectively show top and side views of the support unit 3, FIGS. 6E and 6F show respective opposite end views of the support unit 3 in a working position. FIG. 6B shows the support unit 3 in a loading position with the support arm 14 pivoted or tilted upwardly to receive a workpiece being loaded thereon, while FIG. 6C shows the retracted position or so-called park position with the support arm 14 entirely retracted inside the housing or enclosure of the support column or stand 15.

In the end views of FIGS. 6E and 6F, respective double-ended arrows show respective degrees of freedom of linear motion of the support arm 14 and its components relative to the support column 15. As already mentioned in connection with the support bridges 12 and 13, all of the support arms 14, as well as the support bridges 12 and 13, can be moved independently alone or synchronously with each other in height in the vertical Z-direction, both upwardly and downwardly as needed, in order to achieve an ergonomic loading height and/or to achieve an optimal working height for the machine 16. Furthermore, the support arm 14 is connected to the column 15 by means of a support beam or element 32, which further enables a linear motion of the support arm 14 in the Y-direction, as well as a pivoting motion about a pivot axis 33 (see FIG. 6A), whereby this pivoting motion can be seen, for example, by comparing FIGS. 6B, 6E and 6C. With these freedoms of motion, the pivot arm 14 can be fully folded and completely retracted into a park position, as shown in FIG. 6C, for example when it is not being used or to keep it out of the way of other equipment such as the machine 16, or can be pivoted upwardly about the pivot axis 33 into a nearly vertical upright loading position for receiving a new workpiece as shown in FIG. 6B.

For loading a workpiece into the apparatus 10, the support arms 14 of one row of the support units (e.g. support arms 143, 145 and 147 in FIG. 3A) are pivoted upwardly about their respective pivot axes 33 in synchronism with one another, to facilitate loading of a vertically supplied workpiece thereon. In the illustrated embodiment, the loading of a workpiece is usually carried out from one side of the apparatus, so that the support arms 143, 145 and 147 on this side, i.e. of this associated support row, are respectively provided with respective telescoping arm extensions 29, which can be telescopically extended, in order to support the workpiece over a greater width and particularly extending over the middle or center line of the workpiece. The telescope arm 29 is extendable out of the head or free end of the respective support arm 143, 145 or 147 to a length corresponding to the respective size of the workpiece to be loaded.

In addition to the telescope arm 29, each one of the support arms 143, 145 and 147 is further provided with respective load receivers 30 and 31. The inner load receiver 30 is provided in the area of the head or free end of the telescope arm 29 for supporting the workpiece 21 at this location. The inner load receiver 30 is thus embodied as a contact support point or workpiece contact surface. On the other hand, the lower outer edge of the workpiece 21 is supported and fixed on the outer load receiver 31. Further details regarding the outer load receiver 31 are shown and will be described below in connection with FIG. 11. Generally, the outer load receiver 31 is arranged on the support arm 14 in a toothed rack or rack and pinion guide 34, which may also comprise a gear rack drive 34. In this manner, the outer load receiver 31 can be flexibly or adjustably moved and positioned corresponding to the size of the workpiece 21 that is to be received and loaded. The load receivers 30 and 31 may be pre-adjusted depending on the workpiece size, workpiece geometry, and desired position of the workpiece on the holding system, either manually, in a motor driven manner, or by means of a numerically controlled workpiece programming.

By means of the support arms 143, 145 and 147 and their respective associated telescoping arm extensions 29, the vertically supplied workpiece 21 can be supported and held alone by the holding apparatus 10, without further relying on any support from the transport means (e.g. an overhead crane) that was used to guide or supply the workpiece. Once the workpiece 21 is arranged and held on the support arms 14, i.e. the support arms 143, 145 and 147, then the workpiece can be released from the crane, and the support arms can be pivoted downwardly about their respective pivot axes 33 so as to pivot the workpiece from the substantially vertical loading position into the substantially horizontal clamping or fixing position. In this position, the workpiece is secured and supported by means of the individual mounting fixtures 22, which are embodied as individual suction units 28 in the illustrated embodiment. Details regarding the suction units 28 are shown and described in connection with the subviews of FIGS. 9 and 10.

The embodiment of the support arms 143, 145 and 147 with telescope arms 29 as well as with the load receivers 30 and 31 in only one support row, i.e. only on the support units on one side of the holding apparatus 10, is specific to or dependent on the particular workpiece. In other embodiments of the invention it is possible to equip each support arm 14 with a respective telescopic extension and/or with load receivers. With such an arrangement, for example, narrower workpieces can be loaded from both sides of the holding apparatus 10, for example a respective workpiece with a width equal to or less than one half of the working width of the machine can be loaded onto the support units 2, 4 and 6 on one side, and another similar narrow workpiece can be loaded onto the support units 3, 5 and 7 on the other side of the holding apparatus 10, to then be lowered from both sides respectively into the working position.

The several subviews of each of the FIGS. 7 to 11 show important components of the workpiece support units 1 to 8, such as the clamping units, fixing units, suction units, and load receivers, as individual details.

FIGS. 7A, 7B and 7C respectively show side, front and top views of the clamping unit 24, which is mounted on the support bridge 12 or 13 (see FIG. 4 or 5), and which is driven and positionable along the respective bridge 12 or 13 on a gear rack or rack and pinion drive provided on an arcuate guide rail 26A of the respective support bridge 12 or 13. The clamping unit 24 includes a base body 242, which serves as a carrier for the necessary components for the drive and the necessary control lines for the control positioning of the clamping unit 24, as well as a clamping head 241 arranged on the base body 242. An adjusting drive or actuator drive 243 embodied in the form of a spindle drive is provided to enable an adjustment of the clamping head 241 in the vertical Z-direction. A further adjusting or actuator drive 244 is provided to achieve an adjusting movement of the clamping head 241 in the longitudinal X-direction. A pneumatic cylinder 245 is provided to pivot the clamping head 241, and to carry out a stroke for generating the required clamping force via the clamping head.

FIGS. 8A, 8B and 8C respectively show a side view, a front view, and a top view, of a fixing unit 25 which may be provided on the front or rear support bridge 12 or 13. The positioning of the fixing unit 25 on the support bridge 12 or 13 is achieved via an arcuate guide, for example an arcuate guide rail 26B preferably provided with a gear rack guide or a rack and pinion drive. The fixing unit 25 comprises a base body 252, on which the fixing head 251 of the fixing unit 25 is arranged via an outrigger or extension arm 254. An alignment pin 255 is provided on the fixing head 251 and is adapted to be inserted into a receiving hole provided at a predefined location of a workpiece 21 so as to fix the position of the workpiece 21. In order to reach any point along a workpiece clamping or holding area 27, the fixing unit 25 and especially the fixing head 251 thereof can carry out not only the adjusting movement in the Y-direction, but also a moving adjustment in the Z-direction by means of an adjusting or actuator drive 253. The fixing head 251 itself is pivotable in two directions about numerically controlled axes in order to be optimally adapted to any given contour of a specific workpiece.

A preferred example of an individual mounting fixture 22 provided on any one of the support arms 14 is embodied as a suction unit 28, as shown in the several subviews of FIGS. 9 and 10. The suction unit 28 comprises a base body 282, on which a suction head 281 as a particular embodiment of a workpiece support element 23 is arranged, mounted, or adapted. The suction unit 28 is movable and positionable along the respective support arm 14 by means of a gear rack or rack and pinion drive 34, as also shown in FIG. 6. An adjusting motion in the Z-direction is achieved by means of an adjusting or actuator drive 283. An air line 284 supplies pressurized air to the suction head 281, in order to form a pressurized air cushion between the suction head 281 and the workpiece 21 to allow the workpiece to be "floatingly" moved and positioned on the holding apparatus 10 before being clamped and secured thereon. Furthermore, the suction unit 28 includes an ejector 285 to which the pressurized air may be supplied to create a vacuum or negative pressure suction that is applied to the suction head 281 to generate the necessary suction force between the suction head 281 and the workpiece 21 for securing and holding the workpiece 21 on the suction unit 28.

FIG. 10, with its three subviews, shows the suction head 281 as an enlarged detail, whereby the suction head 281 may be connected by means of an adapter to the base body 282. In order to optimally adapt the suction head 281 to the cylindrical or spherical curvature of the workpiece 21, the suction head 281 includes a hemispherical cup 286 as well as seal lips 287 thereon to achieve an airtight suction seal between the suction head 281 and the workpiece 21. In further embodiments of the invention, the individual mounting fixture 22 may comprise, as an alternative to a suction unit 28, a receiver unit that includes workpiece contact points or other mechanical holding elements, grippers, clamps, screw-in mounting studs, hooks, magnetic holding elements, or the like, according to any conventionally known teachings, rather than a suction head 281 of the above described suction unit 28.

The several subviews of FIGS. 11 and 12 show the outer load receiver 31 as a separate detail. The load receiver 31 includes a base body 312 with the load receiving head 311 arranged thereon. The load receiving head 311 can be moved or adjusted in its vertical height by means of a suitable actuator or adjusting drive 313, and is pivotably supported in a journalled or gimbaled manner. The load receiver 31 is movable and positionable along the respective support arm 14 on a geared rack or rack and pinion guide or drive 34. The specific positioning of the load receiving head 311 is carried out dependent on the size of the workpiece. Clamping jaws 314 are provided on the load receiving head 311, and serve to securely clampingly hold the workpiece 21 on a contact edge 315 after the workpiece 21 and the load receiver 31 have been properly positioned. Note that FIGS. 12A and 12B show two different examples with workpieces 21 having different degrees of curvature, whereby the clamping jaws 314 are accordingly adjusted to hold the workpiece 21 at the appropriate curvature or slope angle.

As an example, a process of loading, positioning, and then securely holding a large format workpiece onto the inventive flexible holding apparatus 10 can be carried out in the following manner. The large format workpiece 21 is supported in a substantially vertical orientation and delivered to the holding apparatus 10 by an overhead crane or the like. To carry out the loading process, the support arms 143, 145 and 147 of one holding side that are provided with load receivers 30 and 31 are pivoted up into the loading position. Then, the workpiece 21 is lowered by the overhead crane, so that the lower side edge of the workpiece 21 is set onto the contact edge or corner 315 of each respective outer load receiver 31 so that the workpiece 21 rests thereon. The telescope arm 29 is extended to the appropriate length from each support arm 143, 145 and 147, and the respective inner load receivers 30 provided on the telescope arms 29 support the workpiece 21 in an area extending outwardly beyond the middle or center line of the workpiece. At this time, the workpiece 21 can be released from the overhead crane, and the workpiece is then completely supported by the row of support units 3, 5 and 7 via the support arms 143, 145 and 147.

Next, the support arms 143, 145 and 147 are tilted or pivoted downwardly from the loading position into the clamping or support position, in which the opposite located support arms 142, 144 and 146 of the other support side or zone have already been positioned and are waiting. Thus, once the support arms 143, 145 and 147 have been lowered to the support position, the workpiece 21 will be supported over its entire surface by the cooperation of all of the support arms 142, 143, 144, 145, 146 and 147. At this time, compressed air is provided to the suction heads 281 of the suction units 28 so that the workpiece 21 is "floatingly" supported and can be slidingly shifted thereon for positioning the workpiece. For this purpose also, the alignment pins 255 of the respective fixing units 25 provided on the support bridges 12 and 13 are inserted into respective corresponding receiver holes of the workpiece 21 in order to fix the proper position of the workpiece.

After the alignment pins 255 have been fixed in this manner, the workpiece 21 is clampingly held at its front and rear edges by means of the clamping units of the support bridges 12 and 13. Also, the suction units 28 of the support arms 14 are switched to suction operation to securely hold the workpiece 21 by suction thereto. In order to provide accessibility for the lower tool 18 to move to the successive required working locations (e.g. riveting locations), the support bridges 12 and 13 as well as the support arms 14 are synchronously moved in the Z-direction into the working position. Then, the actual working process, such as the riveting of the workpieces, can be carried out as described above in connection with FIG. 2. It should be understood that a plurality of separate workpieces can each be loaded and supported on the present holding apparatus in succession next to one another, so that these several workpieces can then be riveted together once they are held by the apparatus.

As the working machine 16, such as a riveting machine 16, carries out its riveting process at successive rivet locations, one or more of the respective support units 2 to 7 can be operated independently as needed to release their respective support arm 14 from the workpiece 21, and then to move away from the respective active working area of the machine 16, in order to give the machine 16 the required space for carrying out its work cycle in the area of the support that was provided by that respective support arm or arms 14. Nonetheless, at the same time, the largest possible number of the other support units remain in place and continue to support the workpiece 21. Once the riveting operation is completed in that respective working zone, then the previously removed support arm is returned to its position supporting the workpiece, and a next support arm in a next intended working zone is released from the workpiece and moved out of the way of the riveting machine. In this way, the support arms are respectively individually moved successively into and out of their workpiece supporting positions, as the riveting process carried out by the riveting machine progresses to successive corresponding working or riveting zones.

All movements of the support units as well as their components are controlled and coordinated by means of one or more suitable numerical controls, for example embodied in control programs in the computer control station. This makes it possible to achieve a synchronous motion of the individual support units and their components, but also an independent movement of any single one of the support units and its components, in a substantially fully automatic manner. All of the motions of the various components can be driven by any conventionally known motors or actuators of any kind, for example including pneumatic, hydraulic and electric motors and linear actuators.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A holding apparatus for holding large format workpieces to be worked on by a machine, said apparatus comprising:

an apparatus rail system including first and second rails extending parallel to each other in a longitudinal direction;

a first row of workpiece support units that are each movably arranged on said first rail to be independently movable therealong in said longitudinal direction; and a second row of workpiece support units that are each movably arranged on said second rail to be independently movable therealong in said longitudinal direction;

wherein:

each one of said workpiece support units of said first row and of said second row respectively comprises a respective support stand that is movably arranged on a respective one of said rails to be independently movable therealong in said longitudinal direction, and a respective workpiece support arm that has a supported end pivotably connected to said support stand so as to be independently vertically pivotable relative thereto, and that is adapted to support at least one workpiece;

a workpiece space adapted to receive at least one workpiece is formed between said support stands of said first row of said support units and said support stands of said second row of said support units;

each said support arm has a free unsupported end opposite said supported end;

said support arms extend crosswise relative to said longitudinal direction into said workpiece space with said free unsupported ends respectively oriented toward the opposite one of said rows of said support units; and each one of said support arms can be moved, independently of the other ones of said support arms, away from the at least one workpiece, to provide an unobstructed working zone for the machine to work on the at least one workpiece in said working zone.

2. A holding apparatus for holding large format workpieces to be worked on by a machine, said apparatus comprising:

an apparatus rail system; and a plurality of workpiece support units including a respective first set and a respective second set of said support units that are each movably arranged on said rail system, with a workpiece space adapted to receive at least one of the workpieces between said first set and said second set of said support units;

wherein each one of said support units of said first set and of said second set respectively comprises a respective support arm that is linearly movable and pivotable, and that is adapted to hold at least one of the workpieces; and wherein at least a selected one of said support arms of said support units can be moved away from the at least one workpiece and out of a respective selected working zone of the machine to allow the machine to work on the at least one workpiece in the selected working zone, while the remaining ones of said support arms other than said at least one selected support arm that are not in the selected working zone continue simultaneously to hold the at least one workpiece.

3. The holding apparatus according to claim 2, wherein said at least one selected support arm, which would otherwise be in the way of the machine while the machine is working on the at least one workpiece in said respective selected working zone, can, independently of the other ones of said support arms, release the at least one workpiece and move out of the way of the machine.

4. The holding apparatus according to claim 2, wherein said at least one selected support arm consists of the minimum number of said support arms necessary to vacate said selected working zone, and said remaining support arms consist of the maximum number of said support arms that do not obstruct said selected working zone.

5. The holding apparatus according to claim 2, wherein said first set of said support units is arranged as a first row of said support units forming a first support zone, said second set of said support units is arranged as a second row of said support units forming a second support zone, and said rows extend parallel to each other in a longitudinal direction that is parallel to a main motion axis of the machine.

6. The holding apparatus according to claim 5, wherein said support units of said first row are staggered alternately with said support units of said second row in said longitudinal direction.

7. The holding apparatus according to claim 2, wherein said rail system comprises rails extending parallel to each other in a longitudinal direction, each one of said support units respectively further comprises a respective support stand that is movably arranged on a respective one of said rails to be movable therealong in said longitudinal direction, and said support arm of each respective one of said support units is pivotably connected to and supported by said support stand of said respective support unit.

8. The holding apparatus according to claim 7, wherein said support arm of each respective one of said support units is pivotable and retractable into a retracted position completely within said support stand of said respective support unit.

9. The holding apparatus according to claim 2, wherein said plurality of workpiece support units further includes first and second outer support units arranged with said first set and said second set of said support units therebetween, wherein each one of said outer support units respectively comprises a first support stand arranged on a first side of said workpiece space together with said first set of said support units, a second support stand arranged on a second side of said workpiece space together with said second set of said support units, and a support bridge arch that extends across said workpiece space and is supported at two opposite ends thereof on said first and second support stands.

10. The holding apparatus according to claim 9, wherein at least one of said outer support units further comprises a clamping unit arranged on said support bridge arch and adapted to clampingly hold an edge of the at least one workpiece.

11. The holding apparatus according to claim 9, wherein at least one of said outer support units further comprises a fixing unit arranged on said support bridge arch and adapted to cooperate with a receiver hole of the at least one workpiece to fix a position of the at least one workpiece.

12. The holding apparatus according to claim 9, wherein at least said first outer support unit is arranged clear of said apparatus rail system so that said support units of said first set and of said second set can be selectively moved along said apparatus rail system past said support stands of said first outer support unit while said support stands of said first outer support unit remain stationary, so as to vary the number of said support units of said first set and said second set that are to be used for supporting the at least one workpiece at any time.

13. The holding apparatus according to claim 9, further comprising a controller and control lines connecting said controller to said support units of said first set and said second set and to said first and second outer support units, so as to independently or synchronously move said support arms and said support bridge arches selectively upward or downward.

14. The holding apparatus according to claim 2, wherein said support arms of said support units are vertically movable between a loading position and a working position, and to selectively form a clear passage space below said support arms.

15. The holding apparatus according to claim 2, wherein each one of said support units further respectively comprises a pivot axis about which said support arm thereof is pivotable into an upright position adapted to have the at least one workpiece in a vertical orientation loaded thereon.

16. The holding apparatus according to claim 2, wherein at least one of said support units further comprises an individual mounting fixture arranged on said support arm thereof and adapted to hold the at least one workpiece.

17. The holding apparatus according to claim 16, wherein said support units are movable along said rail system in a longitudinal direction, said mounting fixture is movable along said support arm on which said mounting fixture is arranged in a direction extending crosswise relative to said longitudinal direction, and said mounting fixture comprises a fixture body and a workpiece holding element that is connected to and vertically movable relative to said fixture body.

18. The holding apparatus according to claim 16, wherein said mounting fixture comprises a suction unit including a suction head to which pressurized air may selectively be supplied to form an air cushion between said suction head and the workpiece so as to floatingly support the workpiece thereon, and to which a suction may selectively be applied to generate a suction force for holding the workpiece thereon.

19. The holding apparatus according to claim 2, further comprising first load receivers that are respectively adjustably arranged near pivotally supported ends of said support arms of at least one of said sets of said support units and that are positioned, configured and adapted to receive and support thereon an edge of a workpiece that is supplied in a vertical orientation.

20. The holding apparatus according to claim 19, further comprising second load receivers that are respectively adjustably arranged near free unsupported ends of said support arms of said at least one of said sets of said support units and that are positioned, configured and adapted to receive and support a major surface of the workpiece thereon.

21. The holding apparatus according to claim 20, further comprising a controller and control lines connecting said controller to said support units having said first and second load receivers, wherein said controller is adapted to adjust said first and second load receivers dependent on a size, geometry or desired position of the workpiece to be loaded thereon before the workpiece is loaded thereon.

22. The holding apparatus according to claim 2, further comprising second load receivers that are respectively adjustably arranged near free unsupported ends of said support arms of at least one of said sets of said support units and that are positioned, configured and adapted to receive and support a major surface of the workpiece thereon.

23. The holding apparatus according to claim 2, wherein at least one of said support arms includes a support arm primary member and a support arm extension that is selectively telescopically extendable from a free end of said support arm primary member.

24. A combination comprising the holding apparatus according to claim 2 and two workpieces that each have a width corresponding to no more than half of a total working width of said workpiece space, wherein one of said workpieces is arranged and supported on said support arms of said first set of said support units and another of said workpieces is arranged and supported on said support arms of said second set of said support units.

25. A combination comprising the holding apparatus according to claim 7 and an orbital riveting machine, which includes a lower riveting tool and an upper riveting tool, wherein said lower riveting tool is movable in said longitudinal direction below said support arms and laterally between said support stands of said support units, and said upper riveting tool is movable in said longitudinal direction above said support arms of said support units.

26. A method of using the combination according to claim 25, for performing riveting on a large format workpiece, comprising the steps:
   a) loading and supporting said workpiece on said support arms;
   b) moving at least a selected one of said support arms that is within a selected working zone out of said selected working zone and clear of said riveting machine;
   c) moving said tools of said riveting machine into a position for performing riveting in said selected working zone and then performing said riveting in said selected working zone using said tools; and
   d) during said steps b) and c) continuing to support said workpiece on the remaining ones of said support arms other than said at least one selected support arm.

27. A method of loading a workpiece onto the holding apparatus according to claim 20, comprising the steps:
   a) pivoting said support arms provided with said first and second load receivers upwardly into an upright loading position;
   b) using a workpiece transport arrangement to carry and lower a workpiece toward said support arms in said upright loading position;
   c) setting a side edge of said workpiece onto said first load receivers;
   d) laying said workpiece against said second load receivers;
   e) after said steps c) and d), releasing said workpiece from said workpiece transport arrangement so that said workpiece is supported solely on said support units including said first and second load receivers;
   f) after said step e), pivoting said support arms downwardly from said upright loading position to a support position in which said workpiece additionally contacts and is additionally supported by the opposite one of said sets of said support units;
   g) fixing a position of said workpiece on said apparatus;
   h) clampingly holding end edges of said workpiece; and
   i) holding said workpiece with mounting fixtures provided on said support arms.

* * * * *